United States Patent
Lee et al.

(10) Patent No.: US 10,040,147 B2
(45) Date of Patent: Aug. 7, 2018

(54) LOW-MELTING IRON-BASED FILLER ALLOYS

(71) Applicants: DongMyoung Lee, Cleveland, OH (US); Gerhard E. Welsch, Cleveland, OH (US)

(72) Inventors: DongMyoung Lee, Cleveland, OH (US); Gerhard E. Welsch, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 385 days.

(21) Appl. No.: 14/562,125

(22) Filed: Dec. 5, 2014

(65) Prior Publication Data
US 2015/0158127 A1    Jun. 11, 2015

Related U.S. Application Data

(60) Provisional application No. 61/912,086, filed on Dec. 5, 2013.

(51) Int. Cl.
| | |
|---|---|
| C22C 38/02 | (2006.01) |
| C22C 38/08 | (2006.01) |
| B23K 35/28 | (2006.01) |
| B23K 35/22 | (2006.01) |
| B23K 35/30 | (2006.01) |
| B23K 35/02 | (2006.01) |
| C22C 9/00 | (2006.01) |
| C22C 19/05 | (2006.01) |
| C22C 38/18 | (2006.01) |
| C22C 38/40 | (2006.01) |
| C22C 38/44 | (2006.01) |
| B23K 103/02 | (2006.01) |

(52) U.S. Cl.
CPC ...... *B23K 35/3066* (2013.01); *B23K 35/0233* (2013.01); *B23K 35/0244* (2013.01); *B23K 35/302* (2013.01); *B23K 35/3053* (2013.01); *C22C 9/00* (2013.01); *C22C 19/05* (2013.01); *C22C 19/058* (2013.01); *C22C 38/08* (2013.01); *C22C 38/18* (2013.01); *C22C 38/40* (2013.01); *C22C 38/44* (2013.01); *B23K 2203/02* (2013.01); *Y10T 403/479* (2015.01); *Y10T 428/12431* (2015.01)

(58) Field of Classification Search
None
See application file for complete search history.

(56) References Cited

U.S. PATENT DOCUMENTS

| | | | | |
|---|---|---|---|---|
| 2,864,693 | A * | 12/1958 | Cape | B23K 35/3033 420/36 |
| 4,402,742 | A * | 9/1983 | Pattanaik | B23K 35/3066 420/112 |
| 8,894,780 | B2 * | 11/2014 | Nuetzel | C22C 19/03 148/426 |
| 8,951,368 | B2 * | 2/2015 | Hartmann | B23K 35/0233 148/327 |
| 2004/0184945 | A1 * | 9/2004 | Sjodin | B23K 35/3086 420/42 |

FOREIGN PATENT DOCUMENTS

| | | | | |
|---|---|---|---|---|
| EP | 1875984 A2 * | 1/2008 | | B23K 35/02 |
| JP | 2004-001065 | * | 1/2004 | |

OTHER PUBLICATIONS

Machine-English translation of JP 2004-001065, Sato Yuichi et al., Jan. 8, 2004.*

* cited by examiner

*Primary Examiner* — Deborah Yee

(74) *Attorney, Agent, or Firm* — Tarolli, Sundheim, Covell & Tummino LLP

(57) ABSTRACT

A braze alloy includes by atom %, about 30% to about 60% iron, 0 to about 40% nickel, and about 10% to about 20% in total of melting point depressants selected from the group consisting of phosphorous, carbon, boron, and silicon.

16 Claims, No Drawings

LOW-MELTING IRON-BASED FILLER ALLOYS

RELATED APPLICATION

This application claims priority from U.S. Provisional Application No. 61/912,086, filed Dec. 5, 2013, the subject matter of which are incorporated herein by reference in their entirety.

TECHNICAL FIELD

The present invention relates to economical filler-alloy compositions for brazing stainless steels and other iron-based alloys. For parts made of iron-based alloys, the filler-alloy can provide a robust joining medium with good corrosion resistance by wetting the surface of base materials and forming metallurgical bonds, e.g., by interdiffusion of filler-alloy elements with those of the base material.

BACKGROUND

Iron alloys are widely used in industries. Stainless steels, alloy steels and carbon steels are important engineering materials based on iron. To make complex or large iron alloy structures, iron alloy parts or components can be joined by welding or brazin. Brazing is a joining technology in which structures with high joint strength and corrosion resistance can be made. Brazing technology is well suited for bonding of complicated parts, for example, in the production of heat exchangers and honeycomb panels. Properties of joints made by brazing are strongly dependent on filler alloy properties, such as melting temperature and composition. Advantageously, filler alloys have melting temperatures high enough to enable rapid surface-bonding reactions with base materials and yet low enough to minimize phase transformations and microstructure-coarsening of base materials, which can save brazing time and energy. When corrosion resistance of the bonded structure is an additional requirement it is beneficial that the filler material be of similar composition to the base material or include elements that impart self-passivations to the base material and the joint between base and filler material.

Prior art filler alloys for steels are mainly nickel or copper based alloys. Their melting temperatures are typically higher than 1000° C., from which it follows that brazing with the filler alloys requires a temperature around 1100° C. At this temperature most steels recrystallize easily and develop a coarse grain structure. Additionally, copper and nickel are nobler than iron and can produce unfavorable electrochemical potential in a corrosive environment that attacks the iron/steel near the Cu or Ni-containing braze joint. These prior art alloys have other disadvantages, namely the raw material cost of nickel and copper is relatively high, and their filler-metal compositions are greatly different from the iron-base material. Therefore, development of new iron-based filler alloys with melting temperature less than 1000° C. can overcome some of the disadvantages of the prior art filler metals for the brazing of steels.

SUMMARY

Embodiments described herein relates to a braze alloy comprising by atom %, about 30% to about 60% iron, 0 to about 40% nickel, and about 10% to about 20% in total of melting point depressants selected from the group consisting of phosphorous, carbon, boron, and silicon. The braze alloy can be used in a brazed construction to braze iron based materials or parts at a temperature below 1000° C. to join and repair the material with little or no recrystallization of the base iron based materials while maintain the base materials strength and ductility values in fine-grained conditions. The braze alloy can also be used as a filler material to repair cracks and wear of steal dies and molds used in forging and die-casting as well to repair surface voids or cracks in cast-iron or cast-steel products.

In some embodiments, the braze alloy further at least one of chromium, manganese, or molybdenum. The at least one of chromium, manganese, or molybdenum can be provided in the braze alloy at amount such the braze alloy is a stainless steel.

In other embodiments, the braze alloy can have a melting temperature below about 1000° C., below about 950° C., or below about 900° C.

In some embodiments, the braze alloy can include by atom % about 25% to about 40% nickel and about 40% to about 60% iron.

In still other embodiments, the braze alloy can be provided in foil or powder form and be used to braze, repair, and/or fill iron based parts.

DETAILED DESCRIPTION

When introducing elements of various embodiments of the present invention, the articles "a," "an," "the," and "said" are intended to mean that there are one or more of the elements, unless otherwise indicated. The terms "comprising," "including," and "having" are intended to be inclusive, and mean that there may be additional elements other than the listed elements. As used herein, the term "and/or" includes any and all combinations of one or more of the associated listed items.

Approximating language, as used herein throughout the specification and claims, may be applied to modify any quantitative representation that could permissibly vary without resulting in a change in the basic function to which it may be related. Accordingly, a value modified by a term such as "about" is not limited to the precise value specified. In some instances, the approximating language may correspond to the precision of an instrument for measuring the value.

The liquidus temperature can be contrasted with a "solidus temperature". The solidus temperature quantifies the point at which a material completely solidifies (crystallizes). The liquidus and solidus temperatures do not necessarily align or overlap. If a gap exists between the liquidus and solidus temperatures, then within that gap, the material consists of solid and liquid phases simultaneously (like a "slurry").

"Sealing" is a function performed by a structure that joins other structures together, to reduce or prevent leakage through the joint, between the other structures. The seal structure may also be referred to as a "seal."

Typically, "brazing" uses a braze material (usually an alloy) having a lower liquidus temperature than the melting points of the components (i.e. their materials) to be joined. The braze material is brought slightly above its melting (or liquidus) temperature while protected by a suitable atmosphere. The braze material then flows over the components (known as wetting), and is then cooled to join the components together. As used herein, "braze alloy composition" or "braze alloy", "braze material" or "brazing alloy", refers to a composition that has the ability to wet the components to be joined, and to seal them. A braze alloy, for a particular application, should withstand the service conditions required, and melts at a lower temperature than the base materials; or melts at a very specific temperature.

As used herein, the term "brazing temperature" refers to a temperature to which a brazing structure is heated to enable a braze alloy to wet the components to be joined, and to form a braze joint or seal. The brazing temperature is often higher than or equal to the liquidus temperature of the braze alloy. In addition, the brazing temperature should be lower than the temperature at which the components to be joined may not remain chemically, compositionally, and mechanically stable. There may be several other factors that influence the brazing temperature selection, as those skilled in the art understand.

Embodiments described herein relate to low-temperature iron brazing alloys, which are particularly well suited as filler-alloys for joining iron based components. It was found that P, C, B, and Si can be used as melting point depressants when alloyed to pure iron. The combined effects of P, C, B, and Si alloyed with iron can further lower the melting temperature in such iron-based Fe(P, C, B, Si) alloys. Therefore, in some embodiments described herein, a low-melting iron-based alloy with a solidus (liquidus) temperature below about 1000° C. can be provided.

In some embodiments, the melting temperature of pure iron can be decreased by the addition of P, C, B, and Si. These additives also decrease the melting temperature of pure nickel which is one of the main alloy elements of austenitic stainless steels. Likewise, a decrease of the melting temperature is also achieved when one or more of P, C, B, and Si elements are added to binary solid solution Fe—Ni alloys.

In some embodiment described herein, the low-melting iron alloys can have an Fe—Ni—P—C—B—Si composition and a melting temperature below 1000° C., below 950° C., or about or below 900° C. In some embodiment, the low melting iron alloy can have a composition including by atom %, about 30% to about 60% Fe and 0 to about 40% Ni, with the balance of the composition including about 10% to about 20%, for example about 10% to about 15% in total of melting point depressants selected from the group consisting of P, C, B, and Si. Other alloy elements, such as Cr, Mn, and Mo, can be included in the composition in addition to or instead of Fe or Ni filler alloys to form compositions more similar to those of stainless steels.

The low-melting iron brazing alloys can be produced in the forms of powder and ribbon. The powder can be fabricated by the ball milling and gas-atomizing. The ribbon can be synthesized by melt-spinning. The powder and ribbon preforms are sintered and fed between the base materials to be joined. Because the compositions are similar to stainless steels, they can be applied to the brazing of stainless steels at the processing temperature of around 1000° C. The properties of the low-melting iron alloy and similarity of the composition of the iron alloy are appropriate and/or suited to the brazing of stainless steels. Complex air- and water-tight structures such as heat-exchangers (food or chemical industry) or honeycomb panels (aerospace industry) require the brazing technology. The brazed joints of iron plates can have high joint strength and excellent corrosion resistance by the diffusion and homogenation of the brazing alloys at lower temperatures compared to the conventional Fe-, Ni-, and Cu based brazing alloys.

Advantageously, the iron alloys described herein have a lower melting temperature, lower cost, and reduced metalloid element content compared to known iron based brazing alloys.

(1) Lowered Melting Temperature

The brazing temperature of the prior art alloys are more than 1100° C. (see Fe-, Ni-, and Cu-based brazing alloys in Tables 1 and 2). Compared to the prior art brazing alloys for stainless steel, the iron brazing alloys described herein have much lower melting temperature (e.g., about 900° C.) (see the Table 3). The iron alloys start melting near about 870° C. and end melting at about 900° C. This enables to braze stainless steels below 1000° C.

(2) Low-Cost Fe-Based Compositions

Main composition of the iron alloys described herein is much lower in cost than the Ni and Cu based brazing alloys of Table 2.

(3) Reduced Metalloid Elements Content

The prior art Fe-based brazing alloys contain more than 20% of metalloids for the melting point depressants. It is preferable that the content of these elements should be as low as possible because they form brittle intermetallics at the joint by the reaction with the base stainless steel. The amount of the metalloid elements in the iron alloy described herein is less than or equal to about 20%. Therefore, the brazing alloys of the present invention could reduce the formation of the brittle intermetallics.

TABLE 1

Prior art Fe-based brazing alloys

| | Composition (atom %) | | | | | | | | | | M.P. (° C.) | | |
|---|---|---|---|---|---|---|---|---|---|---|---|---|---|
| | Fe | Ni | Cr | Co | Mo | Mn | B | P | Si | C | Bal. | Sol. | Liq. | Reference |
| 1 | 40.5 | 17.1 | 19.3 | | | | 1.0 | | 11.4 | 10.7 | | 1030 | 1085 | |
| 2 | 54.7 | 17.4 | 1.9 | | | | | | 15.5 | | | 1137 (brazng temp.) | | U.S. Pat. No. 4,410,604 |
| 3 | 36 | 35 | 5 | | | | | | 7 | | | 940 | 1015 | U.S. Pat. No. 4,402,742 |
| 4 | 43 | 30 | 4 | | | | | | 7 | | | 968 | 1070 | |
| 5 | 44 | 30 | 6 | | | | | | 8 | | | 967 | 1110 | |
| 6 | 68 | | 5 | 5 | | | | | 10 | | | 1110 | 1174 | U.S. Pat. No. 6,656,292 |
| 7 | 75 | | | | | | | | 10 | | | 1042 | 1148 | US 2006/0090820 |
| 8 | 52.8 | 11.8 | 17.4 | | 1.0 | 1.6 | 0.1 | 8.4 | 6.8 | 0.1 | | 1055 | 1100 | US 2010/0055495 |
| 9 | 34 | 15 | 28 | | | | | 10 | 12 | | 1 | 1074 | 1104 | U.S. Pat. No. 7,392,930 |

TABLE 2

Prior art Ni and Cu based on brazing alloys

| | | Composition (atom %) | M.P. (° C.) Solidus | M.P. (° C.) Liquidus | Brazing temperatur (° C.) |
|---|---|---|---|---|---|
| Ni based | 1 | $Ni_{62.5}Cr_{13.1}B_{13.9}Si_{7.8}Fe_{2.6}$ | 970 | 1000 | 1065 (1010-1175) |
| | 2 | $Ni_{81}P_{19}$ | 875 | 875 | 980 (925-1095) |
| | 3 | $Ni_{68.6}Cr_{14.3}P_{17.1}$ | 890 | 890 | 1065 (980-1095) |
| | 4 | $Ni_{57.9}Cr_{25.2}P_{16.9}$ | 880 | 950 | 1065 (980-1095) |
| Cu based | 5 | 99.99% Cu | 1083 | 1083 | 1115-1150 |
| | 6 | $Cu_{84.3}Mn_{13.6}Ni_{2.1}$ | 970 | 990 | 1050 |

TABLE 3

Examples of the low-melting Fe-based brazing alloys

| | Composition (atom %) | | | | | M.P. | |
|---|---|---|---|---|---|---|---|
| | Fe | Ni | C | P | Si | B | Solidus | Liquidus |
| 1 | 60 | 25 | 4 | 6 | 2.5 | 2.5 | 880 | 915 |
| 2 | 60 | 23 | 5 | 7 | 2.5 | 2.5 | 890 | 910 |
| 3 | 47 | 40 | 4 | 5 | 2 | 2 | 875 | 920 |
| 4 | 52 | 35 | 4 | 5 | 2 | 2 | 875 | 920 |
| 5 | 51 | 35 | 4 | 5 | 3 | 3 | 880 | 925 |
| 6 | 56 | 30 | 4 | 5 | 3 | 3 | 880 | 945 |
| 7 | 56 | 27 | 7 | 5 | 2 | 2 | 885 | 940 |
| 8 | 58 | 25 | 8 | 4 | 2 | 2 | 887 | 950 |
| 9 | 52 | 30 | 7 | 6 | 2 | 2 | 880 | 920 |
| 10 | 42 | 40 | 7 | 6 | 2 | 2 | 870 | 920 |

From the above description of the invention, those skilled in the art will perceive improvements, changes and modifications. Such improvements, changes and modifications within the skill of the art are intended to be covered by the appended claims. All references, publications, and patents cited in the present application are herein incorporated by reference in their entirety.

Having described the invention, the following is claimed:

1. A braze alloy consisting essentially of by atom %, about 30% to about 60% iron, 0 to about 40% nickel, and about 10% to about 20% in total of melting point depressants selected from the group consisting of phosphorous, carbon, boron, and silicon; wherein the braze alloy contains no more than about 3% boron;
the braze alloy having a melting temperature below 1000° C.

2. The braze alloy of claim 1, having a melting temperature of below about 950° C.

3. The braze alloy of claim 1, including by atom % about 25% to about 40% nickel.

4. The braze alloy of claim 1, including by atom % about 40% to about 60% iron.

5. The braze alloy of claim 1, being in a foil form.

6. The braze alloy of claim 1, being in a powder form.

7. A brazed construction comprising a plurality of individual iron-based parts and a brazed filler alloy joining, filling and/or repairing at least one of the individual iron-based parts, wherein the filler alloy consists essentially of by atom %, about 30% to about 60% iron, 0 to about 40% nickel, and about 10% to about 20% in total of melting point depressants selected from the group consisting of phosphorous, carbon, boron, and silicon; wherein the filler alloy contains no more than about 3% boron;
the filler alloy having a melting temperature below 1000° C.

8. The brazed construction of claim 7, the filler alloy having a melting temperature of below about 950° C.

9. The brazed construction of claim 7, the filler alloy including by atom % about 25% to about 40% nickel.

10. The brazed construction of claim 7, the filler alloy including by atom % about 40% to about 60% iron.

11. The brazed construction of claim 7, wherein the individual parts are composed of iron based alloys.

12. An iron based construction comprising at least one iron-based part and a filler alloy joining, filling and/or repairing at the at least one individual iron-based part, wherein the filler alloy consists essentially of by atom %, about 30% to about 60% iron, 0 to about 40% nickel, and about 10% to about 20% in total of melting point depressants selected from the group consisting of phosphorous, carbon, boron, and silicon; wherein the filler alloy contains no more than about 3% boron;
the filler alloy having a melting temperature of below about 950° C.

13. The construction of claim 12, the filler alloy including by atom % about 25% to about 40% nickel.

14. The braze alloy of claim 1, wherein the melting point depressants consist of phosphorous, carbon, boron, and silicon.

15. The brazed construction of claim 7, wherein the melting point depressants consist of phosphorous, carbon, boron, and silicon.

16. The construction of claim 12, wherein the melting point depressants consist of phosphorous, carbon, boron, and silicon.

* * * * *